United States Patent
Zhang et al.

(10) Patent No.: US 11,337,150 B2
(45) Date of Patent: May 17, 2022

(54) METHOD AND APPARATUS FOR ADJUSTING WAKE-UP PERIOD OF TERMINAL, STORAGE MEDIUM AND ELECTRONIC DEVICE

(71) Applicant: BOE Technology Group Co., Ltd., Beijing (CN)

(72) Inventors: Ying Zhang, Beijing (CN); Hongyan Pei, Beijing (CN); Yi Bian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 43 days.

(21) Appl. No.: 16/852,721

(22) Filed: Apr. 20, 2020

(65) Prior Publication Data

US 2021/0168711 A1    Jun. 3, 2021

(30) Foreign Application Priority Data

Nov. 29, 2019  (CN) .......................... 201911204368.9

(51) Int. Cl.
*H04W 52/02*  (2009.01)
*H04L 43/10*  (2022.01)

(52) U.S. Cl.
CPC ......... *H04W 52/0216* (2013.01); *H04L 43/10* (2013.01)

(58) Field of Classification Search
CPC ......... H04W 52/0216; H04W 52/0232; H04W 52/0248; H04L 43/10; H04L 12/2803; Y02D 30/70
See application file for complete search history.

(56) References Cited

U.S. PATENT DOCUMENTS

2016/0320824 A1* 11/2016 Prathipati ........... H04L 12/2807
2020/0077336 A1*  3/2020 Moner Poy ....... H04W 52/0216
2021/0051590 A1*  2/2021 Hakola ............. H04W 52/0235

* cited by examiner

*Primary Examiner* — Walli Z Butt
(74) *Attorney, Agent, or Firm* — Westman, Champlin & Koehler, P.A.

(57) ABSTRACT

The present disclosure provides a method and apparatus for adjusting a wake-up period of a terminal, a storage medium, and an electronic device. The method includes: broadcasting heartbeat information and remaining in a monitoring state for a first predetermined time; and adjusting a current first wake-up period of a terminal to a second wake-up period when the monitoring state ends according to information received by the terminal in the monitoring state.

15 Claims, 4 Drawing Sheets

METHOD AND APPARATUS FOR ADJUSTING WAKE-UP PERIOD OF TERMINAL, STORAGE MEDIUM AND ELECTRONIC DEVICE

CROSS-REFERENCE TO RELATED APPLICATION(S)

This application claims priority to the Chinese Patent Application No. 201911204368.9, filed on Nov. 29, 2019, entitled "METHOD AND APPARATUS FOR ADJUSTING WAKE-UP PERIOD OF TERMINAL, STORAGE MEDIUM AND ELECTRONIC DEVICE", which is incorporated herein by reference in its entirety.

TECHNICAL FIELD

The present disclosure relates to the field of control of electronic devices, and more particularly, to a method and apparatus for adjusting a wake-up period of a terminal, a storage medium, and an electronic device.

BACKGROUND

Figure 1:
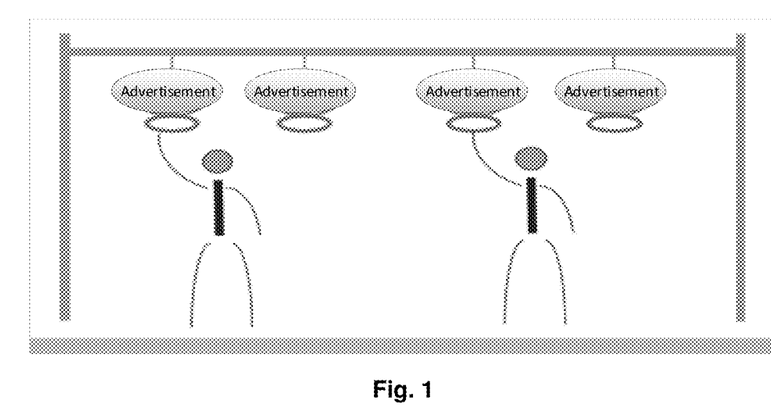
FIG. 1 is a schematic diagram of a tsurikawa terminal in the related art.
Figure 2:
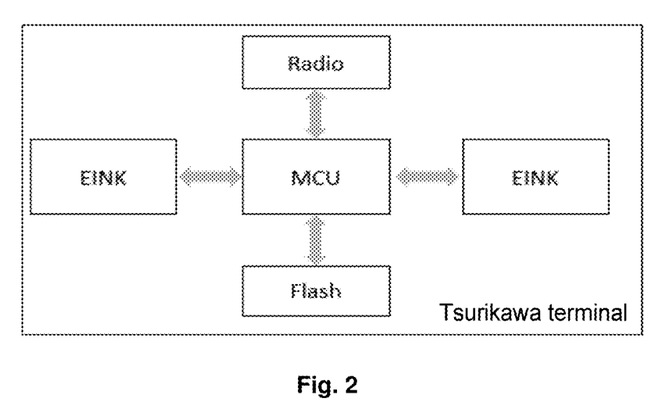
FIG. 2 is a schematic diagram of a hardware structure of a tsurikawa terminal in the related art.

At present, low-power terminals are commonly used in the market to establish a connection with a gateway through a Low-Power Wide-Area Network (LPWAN) to achieve display or refresh function of the terminals. The low-power terminals are primarily applied as tsurikawa terminals mounted in public transportations such as buses, subways etc., that is, tsurikawas having an electronic ink screen display function, as shown in FIG. 1. Each of the tsurikawa terminals displays advertisements through electronic ink screens, and specific content of the advertisements is updated by the gateway when a public transportation where the tsurikawa terminal is mounted is not in operation, so as to achieve update of the advertisements. A structure diagram of the tsurikawa terminal is shown in FIG. 2, and primarily comprises two electronic ink screens "Eink" opposing to each other, a radio frequency circuit "Radio", a Microcontroller Unit (MCU) and an external flash circuit.

In actual use, the low-power terminals are usually powered by batteries, remain in a dormant state for most of time to reduce power consumption, and perform heartbeat detection through scheduled wake-ups to facilitate the gateway to manage operating states thereof and issue tasks thereto. However, the low-power terminals often have the same wake-up time due to being powered on in a centralized manner, which in turn results in centralized broadcasts of heartbeat information, and may thus easily cause air data congestion. This causes failure to receive the heartbeat information or issue tasks by the gateway, thus ultimately resulting in failure to acquire the operating states of the terminals and update the tasks.

SUMMARY

The embodiments of the present disclosure aim to provide a method and apparatus for adjusting a wake-up period of a terminal, a storage medium, and an electronic device, so as to solve the problem in the related art that the wake-up times are the same due to centralized power-on, which in turn results in centralized broadcasts of the heartbeat information, and may thus easily cause air data congestion.

In order to solve the above technical problem, the embodiments of the present disclosure adopt the following technical solutions: a method for adjusting a wake-up period of a terminal, the method comprising:

broadcasting, by the terminal, heartbeat information and remaining in a monitoring state for a first predetermined time; and adjusting, by the terminal, a current first wake-up period of the terminal to a second wake-up period when the monitoring state ends according to information received by the terminal in the monitoring state.

In some embodiments, the information received by the terminal in the monitoring state comprises at least one of gateway response information transmitted by a gateway according to the heartbeat information of the terminal, and heartbeat information broadcast by other terminals.

In some embodiments, before the step of adjusting a current first wake-up period of the terminal to a second wake-up period when the monitoring state ends according to information received by the terminal in the monitoring state, the method further comprises:

detecting whether the terminal receives the gateway response information in the monitoring state;

when the terminal receives the gateway response information, determining an adjustment parameter t to be −rand (0~first time reference/2) if the terminal is an first state, and determining the adjustment parameter t to be 0 if the terminal is in an second state, wherein rand( ) is a random function for generating a random number;

when the terminal does not receive the gateway response information, determining the adjustment parameter t to be 0 if the terminal is in the first state, and determining the adjustment parameter t to be −rand(0~second time reference/2) if the terminal is in the second state; and determining the second wake-up period according to the first wake-up period and the adjustment parameter.

In some embodiments, the step of adjusting a current first wake-up period of the terminal to a second wake-up period when the monitoring state ends according to information received by the terminal in the monitoring state comprises:

adjusting the first wake-up period to a sum of the first wake-up period and the adjustment parameter, wherein the sum of the first wake-up period and the adjustment parameter is the second wake-up period.

In some embodiments, the step of determining the second wake-up period according to the first wake-up period and the adjustment parameter comprises:

detecting whether the terminal in the monitoring state receives the heartbeat information broadcasted by the other terminals;

counting a number M of the heartbeat information received by the terminal in the monitoring state from the other terminals in a case where the terminal receives the heartbeat information broadcasted by the other terminals; and determining the second wake-up period according to the first wake-up period, the adjustment parameter, and the number M of the heartbeat information.

In some embodiments, the step of determining the second wake-up period according to the first wake-up period, the adjustment parameter, and the number M of the heartbeat information comprises:

detecting whether the number M of the heartbeat information of the other terminals is greater than a balance value N;

determining the second wake-up period to be rand(0~(current time reference Tc+t))+r in a case where M>N, wherein r is a random delay number;

detecting whether the current time reference Tc is greater than an initial wake-up period T0 in a case where M≤N;

determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference.

In some embodiments, after detecting whether the number M of the heartbeat information of the other terminals is greater than a balance value N, the method further comprises:

detecting whether a first adjustment number of the second wake-up period exceeds a first preset threshold in a case where M>N;

determining the second wake-up period to be rand(0~(Tc+t))+r in a case where the first adjustment number does not exceed the first preset threshold, and increasing the value of the first adjustment number by 1, wherein r is the random delay number; and adjusting a value of Tc to Tnew in a case where the first adjustment number exceeds the first preset threshold, determining the second wake-up period to be Tnew+r and resetting the first adjustment number to 0, wherein Tnew=(M+1)Tc/N.

In some embodiments, after detecting whether the number M of the heartbeat information of the other terminals is greater than a balance value N, the method further comprises:

detecting whether a second adjustment number of the second wake-up period exceeds a second preset threshold in a case where M≤N and Tc>T0;

determining an intermediate value T' to be (M+1)Tc/N in a case where the second adjustment number does not exceed the second preset threshold, detecting whether T' is greater than T0, determining the second wake-up period to be T0 when T'≤T0, and determining the second wake-up period to be T'+t+r when T'>T0, and increasing the value of the second adjustment number by 1; and adjusting a value of Tc to Tnew in a case where the second adjustment number exceeds the second preset threshold, determining the second wake-up period to be Tnew+t+r, and resetting the second adjustment number to 0, wherein Tnew=(M+1)Tc/N.

In some embodiments, the step of determining the second wake-up period according to the first wake-up period, the adjustment parameter, and the number M of the heartbeat information comprises:

detecting the relationship between the number M of the heartbeat information of the other terminals, a balance value N, and an error tolerance L for the balance value N;

determining the second wake-up period to be rand(0~(current time reference Tc+t))+r in a case where M>N+L, wherein r is a random delay number;

detecting whether the current time reference Tc is greater than an initial wake-up period T0 in a case where M≤N−L;

determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference, resetting the first adjustment number and the second adjustment number to 0 and determining the second wake-up period to be Tc+t+r in a case where N−L<M≤N+L.

The embodiments of the present disclosure further provide an apparatus for adjusting a wake-up period of a terminal, the apparatus comprising:

a radio frequency circuit configured to broadcast heartbeat information and remain in a monitoring state for a first predetermined time; and a processor configured to adjust a current first wake-up period of the terminal to a second wake-up period when the monitoring state ends according to information received by the radio frequency circuit in the monitoring state.

In some embodiments, the information received by the radio frequency circuit in the monitoring state comprises at least one of gateway response information transmitted by a gateway according to the heartbeat information of the terminal, and heartbeat information broadcast by other terminals.

In some embodiments, the processor is further configured to:

detect whether the terminal receives the gateway response information in the monitoring state;

when the terminal receives the gateway response information, determine an adjustment parameter t to be −rand (0~first time reference/2) if the terminal is an first state, and determine the adjustment parameter t to be 0 if the terminal is in an second state, wherein rand( ) is a random function for generating a random number;

when the terminal does not receive the gateway response information, determine the adjustment parameter t to be 0 if the terminal is in the first state, and determine the adjustment parameter t to be −rand(0~second time reference/2) if the terminal is in the second state; and determine the second wake-up period according to the first wake-up period and the adjustment parameter.

In some embodiments, the processor is further configured to:

adjust the first wake-up period to a sum of the first wake-up period and the adjustment parameter, wherein the sum of the first wake-up period and the adjustment parameter is the second wake-up period.

In some embodiments, the processor is further configured to:

detect whether the terminal in the monitoring state receives the heartbeat information broadcasted by the other terminals;

count a number M of the heartbeat information received by the terminal in the monitoring state from the other terminals in a case where the terminal receives the heartbeat information broadcasted by the other terminals; and determine the second wake-up period according to the first wake-up period, the adjustment parameter, and the number M of the heartbeat information.

In some embodiments, the processor is further configured to:

detect whether the number M of the heartbeat information of the other terminals is greater than a balance value N;

determine the second wake-up period to be rand(0~(current time reference Tc+t))+r in a case where M>N, wherein r is a random delay number;

detect whether the current time reference Tc is greater than an initial wake-up period T0 in a case where M≤N;

determine an intermediate value T'=(M+1)Tc/N when Tc>T0, determine the second wake-up period to be T0 when T'≤T0, and determine the second wake-up period to be T'+t+r when T'>T0; and determine the second wake-up period to be Tc+t+r when Tc≤T0, wherein Tc is the first time reference or the second time reference.

In some embodiments, the processor is further configured to:

detect whether a first adjustment number of the second wake-up period exceeds a first preset threshold in a case where M>N;

determine the second wake-up period to be rand(0~(Tc+t))+r in a case where the first adjustment number does not exceed the first preset threshold, wherein r is the random delay number; and adjust a value of Tc to Tnew in a case where the first adjustment number exceeds the first preset threshold, determine the second wake-up period to be Tnew+r and reset the first adjustment number to 0, wherein Tnew=(M+1)Tc/N.

In some embodiments, the processor is further configured to:

detect whether a second adjustment number of the second wake-up period exceeds a second preset threshold in a case where M≤N and Tc>T0;

determine an intermediate value T' to be (M+1)Tc/N in a case where the second adjustment number does not exceed the second preset threshold, detect whether T' is greater than T0, determine the second wake-up period to be T0 when T'≤T0, and determine the second wake-up period to be T'+t+r when T'>T0; and adjust a value of Tc to Tnew in a case where the second adjustment number exceeds the second preset threshold, determine the second wake-up period to be Tnew+t+r, and reset the second adjustment number to 0, wherein Tnew=(M+1)Tc/N.

In some embodiments, the processor is further configured to:

detect the relationship between the number M of the heartbeat information of the other terminals, a balance value N, and an error tolerance L for the balance value N;

determine the second wake-up period to be rand(0~(current time reference Tc+t))+r in a case where M>N+L, wherein r is a random delay number;

detect whether the current time reference Tc is greater than an initial wake-up period T0 in a case where M≤N−L;

determine an intermediate value T'=(M+1)Tc/N when Tc>T0, determine the second wake-up period to be T0 when T'≤T0, and determine the second wake-up period to be T'+t+r when T'>T0; and determine the second wake-up period to be Tc+t+r when Tc≤T0, T0, wherein Tc is the first time reference or the second time reference, reset the first adjustment number and the second adjustment number to 0 and determine the second wake-up period to be Tc+t+r in a case where N−L<M≤N+L.

The embodiments of the present disclosure further provide a non-transitory computer-readable storage medium having stored thereon a computer program which, when executed by a processor, implements the steps of the method according to any of the above technical solutions.

BRIEF DESCRIPTION OF THE ACCOMPANYING DRAWINGS

In order to explain the technical solutions in the embodiments of the present disclosure or in the related art more clearly, accompanying drawings used in the description of the embodiments or the related art will be briefly described below. Obviously, the accompanying drawings in the following description are only some embodiments described in the present disclosure. Other accompanying drawings may further be obtained by those of ordinary skill in the art according to these accompanying drawings without any creative work.

DETAILED DESCRIPTION

Various solutions and features of the present disclosure will be described here with reference to the accompanying drawings.

It should be understood that various modifications may be made to the embodiments of the present application here. Therefore, the above description should not be construed as being limiting, but merely as examples of the embodiments. Those skilled in the art will conceive other modifications within the scope and spirit of the present disclosure.

The accompanying drawings, which are contained in the specification and constitute a part of the specification, illustrate the embodiments of the present disclosure, and are used to explain the principle of the present disclosure together with the general description of the present disclosure given above and the detailed description of the embodiments given below.

These and other features of the present disclosure will become apparent from the following description of some embodiments given as non-limiting examples with reference to the accompanying drawings.

It should also be understood that, although the present disclosure has been described with reference to some specific examples, those skilled in the art may definitively implement many other equivalent forms of the present disclosure, which have the features described in the claims and are thereby within the protection scope defined by the claims.

The above and other aspects, features, and advantages of the present disclosure will become more apparent in view of the following detailed description in combination with the accompanying drawings.

Hereinafter, specific embodiments of the present disclosure will be described with reference to the accompanying drawings; however, it should be understood that the embodiments of the present application are merely examples of the present disclosure, which may be implemented in various ways. Well-known and/or repeated functions and structures have not been described in detail to avoid unnecessary or redundant details which obscure the present disclosure. Therefore, the specific structural and functional details of the present application herein are not intended to be limiting, but merely serve as a basis and representative basis for the claims to teach those skilled in the art to variously use the present disclosure in substantially any appropriate detailed structure.

This specification may use phrases "in one embodiment", "in another embodiment", "in yet another embodiment" or "in other embodiments", which may all refer to one or more of the same or different embodiments according to the present disclosure.

Figure 3:
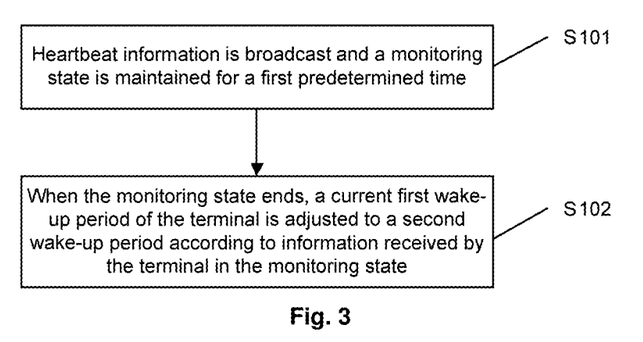
FIG. 3 is a flowchart of a method for adjusting a wake-up period of a terminal according to an embodiment of the present disclosure.

According to an embodiment of the present disclosure, there is provided a method for adjusting a wake-up period of a terminal, which is primarily applied to a low-power terminal. A schematic flowchart of the method is shown in FIG. 3, and primarily comprises steps S101 and S102.

In S101, a terminal, for example, broadcasts heartbeat information and remains in a monitoring state for a first predetermined time.

In S102, when the monitoring state ends, the terminal, for example, adjusts a current first wake-up period of the terminal to a second wake-up period according to information received by the terminal in the monitoring state.

When the low-power terminal is in operation in practice, the terminal is in a dormant state for most of time to save battery power and extend an operating time, and periodically wakes up and broadcasts heartbeat information, so that the terminal is connected to a gateway for update of tasks. After the terminal wakes up, the terminal transmits its own heartbeat information in a broadcast form to notify the gateway that the terminal has woken up. When the gateway receives the heartbeat information, the gateway may transmit invitation information to the terminal to invite the terminal to be connected thereto for management. After the terminal receives the invitation for connection to the gateway from the gateway, the terminal may make a response to be connected to the gateway. After the terminal wakes up, the terminal remains in the monitoring state for a first predetermined time. When the terminal is in the monitoring state, the terminal may receive gateway response information transmitted by the gateway according to the heartbeat information of the terminal, and may further receive heartbeat information broadcast by other terminals. It should be illustrated that the first predetermined time may be the same as the time during which the terminal currently wakes up, or may be any time which is greater than 0 and less than the time during which the terminal currently wakes up, but it should be illustrated that the first predetermined time should last for a period of time to enable the gateway or the other terminals to make a response, and should not be set to a too short time.

When the monitoring state ends, the terminal may currently receive the gateway response information or the heartbeat information broadcast by the other terminals when the terminal is continuously in the monitoring state. In order to prevent wake-up periods of other terminals which have been powered on at the same time as the terminal from being the same as a wake-up period of the terminal, the terminal may currently adjust a current first wake-up period thereof to a second wake-up period according to the information received by the terminal in the monitoring state, and wake up again the second wake-up period after the current wake-up ends. Due to different networks, locations, and data channel congestion conditions, each time different terminals wake up, the different terminals may receive different gateway response information and different heartbeat information broadcast by each of the other terminals. Therefore, the different terminals may determine different next wake-up periods thereof when the different terminals determine the next wake-up periods. Even if current wake-ups of all the terminals end at the same time, the different terminals may wake up at different times due to the difference in the next wake-up periods.

In the present embodiment, the next wake-up periods of the terminals are adjusted according to a condition of the information received by the terminals in the monitoring state, so that each of the terminals may adjust its own wake-up period according to its own actual operation and monitoring condition. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus ultimately resulting in failure to acquire the operating states of the terminals and update the tasks.

Specifically, the wake-up period of the terminal is primarily affected by one or more of the following factors: a current time reference of the terminal, a response condition from the gateway, a number of the heartbeat information received from the other terminals, and a random delay number etc.

The current time reference of the terminal is divided into a first time reference and a second time reference according to specific different time periods. Here, the first time reference primarily corresponds to an first state of the terminal, and usually refers to 7:00 to 22:00 on a current day. By taking a tsurikawa terminal as an example, during this time period, a vehicle where the tsurikawa terminal is located is in an operating state, and has an unfixed position, and the tsurikawa terminal is primarily in a dormant state, and has a relatively long wake-up period. The second time reference corresponds to an second state, and usually refers to 22:00 on a current day to 7:00 on a next day. During this time period, the tsurikawa terminal has a fixed position, and is suitable for communication with the gateway. Therefore, at this time, the tsurikawa terminal is primarily in an operating state or an updating state, and has a relatively short wake-up period. It should be illustrated, however, that the present disclosure is not limited thereto. In other words, in other embodiments, the first state and/or the second state is not limited to the above specific time periods. In some embodiments, the first time reference may last for 2 hours and the second time reference may last for 0.5 hours, but the present disclosure is not limited thereto.

When the terminal is in the monitoring state of the terminal, the terminal may receive the gateway response information. Before the current wake-up period of the terminal is adjusted, it is firstly detected whether the terminal receives the gateway response information in the monitoring state. By taking a tsurikawa terminal as an example, when the tsurikawa terminal is in an first state, the tsurikawa terminal is in a normal state when it fails to receive the gateway response information, and is in an abnormal state when it receives the gateway response information. When the terminal is in an second state, the tsurikawa terminal is in a normal state when it receives the gateway response information, and is in an abnormal state when it fails to receive the gateway response information. When the tsurikawa terminal is in the abnormal state, a wake-up period of the terminal should be appropriately decreased to increase a number of wake-ups of the terminal, so as to enable the tsurikawa terminal to recover to the normal state as soon as possible.

Specifically, in some embodiments, when the gateway response information is received, if the terminal is in the first state, an adjustment parameter t is determined to be an opposite number of a random number between 0 and one half of the first time reference, that is, t=−rand(0~first time reference/2), wherein rand( ) is a random function for generating a random value, and in the present embodiment, a value output by the rand function may comprise opposite endpoints, that is, a value of t may be 0 or "−(first time reference/2)"; and if the terminal is in the second state, the adjustment parameter t is determined to be 0.

In addition, in some embodiments, when the gateway response information is not received, if the terminal is in the first state, the adjustment parameter t is determined to be 0, and if the terminal is in the second state, the adjustment parameter t is determined to be an opposite number of a random number between 0 and one half of the second time reference, that is, t=−rand(0~second time reference/2).

Then, the second wake-up period may be determined according to the current first wake-up period of the terminal and the adjustment parameter which is determined according to a reception condition of the gateway response information. In some embodiments, the second wake-up period may be a sum of the first wake-up period and the adjustment parameter t. Since t has a value of 0 in the normal state of the terminal and has a value of negative number in the abnormal state of the terminal, the second wake-up period may be the same as the first wake-up period when the terminal is in the normal state, and may be shorter than the first wake-up period when the terminal is in the abnormal state, so that the terminal may restore to the normal state as soon as possible by increasing a number of wake-ups.

In some embodiments, a value of the second wake-up period may further be adjusted according to a number of the heartbeat information broadcasted by the other terminals which is received by the terminal in the monitoring state. Firstly, it is detected whether the terminal in the monitoring state receives the heartbeat information broadcasted by the other terminals. If the terminal does not receive the heartbeat information, the impact of the heartbeat information from the other terminals on the terminal may not be considered. In a case where the terminal receives the heartbeat information broadcasted by the other terminals, a number M of the heartbeat information from all the other terminals which is received by the terminal in the monitoring state is counted, and it is detected whether a value of M is greater than an actual measured balance value N of the terminal, wherein N is primarily determined based on factors such as a radio frequency rate of the terminal, a size of a heartbeat packet, and distances between the terminal and the other terminals, and may be obtained through actual measurement when needed. It should be illustrated that when the wake-up period is adjusted according to the number of the received heartbeat information, a statistics process and an adjustment process should be performed for the second state and the first state respectively to have effects on different time references respectively. In the present embodiment, the current time reference Tc is used to refer to the first time reference corresponding to the first state or the second time reference corresponding to the second state, and different time references may be used when the adjustment process is performed for the terminal in different states.

Specifically, the second wake-up period is primarily adjusted according to the number of the heartbeat information in two ways of increasing the wake-up period and decreasing the wake-up period. In a case where the value of M is greater than N, the second wake-up period is adjusted in a way of increasing the wake-up period. At this time, the second wake-up period may be rand(0~(Tc+t))+r, wherein r is a random delay number. When M is less than or equal to N, the second wake-up period is adjusted in a way of decreasing the wake-up period. At this time, firstly, it is detected whether the current time reference Tc is greater than an initial wake-up period T0 (that is, an initial default wake-up period of the terminal). When Tc>T0, an intermediate value T' is determined to be (M+1)Tc/N. Then, a value of T' is compared with a value of T0. When T'≤T0, the second wake-up period is determined to be T0, i.e., the initial default wake-up period of the terminal. When T'>T0, the second wake-up period is determined to be T'+t+r, wherein t is the adjustment parameter which is determined according to the response condition from the gateway, and r is the random delay number; and when Tc≤T0, the second wake-up period is directly determined to be Tc+t+r, wherein t is the adjustment parameter which is determined according to the response condition from the gateway, and r is the random delay number.

Further, if it needs to adjust a next wake-up period of the terminal for several consecutive wake-ups of the terminal, a number of adjustment processes may be decreased by directly adjusting the current time reference. Specifically, in actual use, each time the second wake-up period is adjusted, a counter is triggered to count a number of adjustment processes. After it is detected whether the number M of the heartbeat information of the other terminals is greater than the balance value N, it may be determined accordingly whether it needs to adjust the current time reference according to the counted number of the adjustment processes.

In a case where M>N, a current number of adjustment processes which are performed by the terminal on the second wake-up period is a first adjustment number. At this time, it is detected whether the first adjustment number exceeds a first preset threshold. In a case where the first adjustment number does not exceed the first preset threshold, the second wake-up period is directly adjusted to rand(0~(Tc+t))+r in the manner described above, and a value of the first adjustment number is increased by 1 as a basis for next judgment. In a case where the first adjustment number exceeds the first preset threshold, the current time reference Tc is adjusted to Tnew, and the second wake-up period is determined to be Tnew+r, wherein Tnew=(M+1)Tc/N. At this time, the first adjustment number is reset to 0, and is counted again during a next adjustment process. It is to be noted that: after the value of Tn is adjusted, Tnew is used as the new current time reference Tc to be involved in the operations such as calculations of subsequent steps.

In a case where M≤N and Tc>T0, the current number of adjustment processes which are performed by the terminal on the second wake-up period is a second adjustment number. At this time, it is detected whether the second adjustment number exceeds a second preset threshold. In a case where the second adjustment number does not exceed the second preset threshold, an intermediate value T' is determined to be (M+1)Tc/N in the manner described above. When T'≤T0, the second wake-up period is determined to be T0, and when T'>T0, the second wake-up period is determined to be T'+t+r, and a value of the second adjustment number is increased by 1 as a basis for next adjustment. In a case where the second adjustment number exceeds the second preset threshold, the value of Tc is adjusted to Tnew, the second wake-up period is determined to be Tnew+t+r, and the second adjustment number is reset to 0, wherein Tnew=(M+1)Tc/N. In addition, when M≤N and Tc≤T0, the second wake-up period may be directly determined to be Tc+t+r, and the first adjustment number and the second adjustment number may be reset to 0 at the same time. That is, the time reference needs not to be additionally adjusted at present, and the current wake-up period is adjusted according to the response condition from the gateway and the random delay number.

Further, in some embodiments, the balance value N is typically obtained by field test in a practical application scenario. For example, when the heartbeats from a number of other terminals are listened during the time period for terminal listening, not all of the terminals (the current terminal and the number of other terminals) receives the acknowledgement from the gateway. In such a case, after the number of terminals is reduced, then all the terminals can receive the acknowledgement from the gateway. Then the current number is determined as the balance value N. By repeating this process for many times, multiple N may be obtained, such as $N_1$, $N_2$, $N_3$, etc., and the average value thereof is determined as the final balance value N. Further, an error tolerance L may be determined as the maximum error among all the errors between the multiple measured N and the balance value N. Alternatively, L may also determined as 10% of N or any other empirical value. In this way, the relationship between M and N, L may be detected as follows.

In some embodiments, the step of determining the second wake-up period according to the first wake-up period, the adjustment parameter, and the number M of the heartbeat information comprises:

detecting the relationship between the number M of the heartbeat information of the other terminals, a balance value N, and an error tolerance L for the balance value N;

determining the second wake-up period to be rand(0~(current time reference Tc+t))+r in a case where M>N+L, wherein r is a random delay number;

detecting whether the current time reference Tc is greater than an initial wake-up period T0 in a case where M≤N−L;

determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference, resetting the first adjustment number and the second adjustment number to 0 and determining the second wake-up period to be Tc+t+r in a case where N−L<M≤N+L.

In the present embodiment, both the power consumption and efficiency of the terminal are taken into consideration, and the wake-up period is adjusted according to the time reference, the response condition from the gateway, and the monitored heartbeat conditions of other tsurikawa terminals. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus resulting in failure to acquire the operating states of the terminals and update the tasks.

Figure 4:
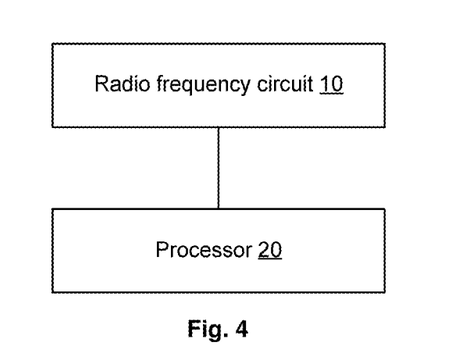
FIG. 4 is a schematic structural diagram of an apparatus for adjusting a wake-up period of a terminal according to an embodiment of the present disclosure.

According to another embodiment of the present disclosure, there is provided an apparatus for adjusting a wake-up period of a terminal, which is primarily applied to a low-power terminal. In some embodiments, the apparatus may be the low-power terminal itself. A schematic structural diagram of the apparatus is shown in FIG. 4, and primarily comprises a radio frequency circuit 10 and a processor 20 which are communicatively coupled to each other. Here, the radio frequency circuit 10 is primarily used to broadcast heartbeat information and remain in a monitoring state for a first predetermined time, and the processor 20 is primarily used to adjust a current first wake-up period of the terminal to a second wake-up period when the monitoring state ends according to information received by the radio frequency circuit in the monitoring state.

When the low-power terminal is in operation in practice, the terminal is in a dormant state for most of time to save battery power and extend an operating time, and periodically wakes up and broadcasts heartbeat information, so that the terminal is connected to a gateway for update of tasks. After the terminal wakes up, the radio frequency circuit 10 transmits heartbeat information of the terminal in a broadcast form to notify the gateway that the terminal has woken up. When the gateway receives the heartbeat information, the gateway may transmit invitation information to the terminal to invite the terminal to be connected thereto for management. After the radio frequency circuit 10 receives the invitation for connection to the gateway from the gateway, the terminal may make a response to be connected to the gateway. After the terminal wakes up, the terminal remains in the monitoring state for a first predetermined time. When the terminal is in the monitoring state, the radio frequency circuit 10 may receive gateway response information transmitted by the gateway according to the heartbeat information of the terminal, and may further receive heartbeat information broadcast by other terminals. It should be illustrated that the first predetermined time may be the same as the time during which the terminal currently wakes up, or may be any time which is greater than 0 and less than the time during which the terminal currently wakes up, but it should be illustrated that the first predetermined time should last for a period of time to enable the gateway or the other terminals to make a response, and should not be set to a too short time.

When the monitoring state ends, the terminal may currently receive the gateway response information or the heartbeat information broadcast by the other terminals when the terminal is continuously in the monitoring state. In order to prevent wake-up periods of other terminals which have been powered on at the same time as the terminal from being the same as a wake-up period of the terminal, the processor 20 may adjust a current first wake-up period of the terminal to a second wake-up period according to the information received by the terminal in the monitoring state, and wake up again the second wake-up period after the current wake-up ends. Due to different networks, locations, and data channel congestion conditions, each time different terminals wake up, the different terminals may receive different gateway response information and different heartbeat information broadcast by each of the other terminals. Therefore, processors 20 of the different terminals may determine different next wake-up periods thereof when the different terminals determine the next wake-up periods. Even if current wake-ups of all the terminals end at the same time, the different terminals may wake up at different times due to the difference in the next wake-up periods.

In the present embodiment, the next wake-up periods of the terminals are adjusted according to a condition of the information received by the terminals in the monitoring state, so that each of the terminals may adjust its own wake-up period according to its own actual operation and monitoring condition. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus ultimately resulting in failure to acquire the operating states of the terminals and update the tasks.

Specifically, the wake-up period of the terminal is primarily affected by one or more of the following factors: a current time reference of the terminal, a response condition from the gateway, a number of the heartbeat information received from the other terminals, and a random delay number etc.

The current time reference of the terminal is divided into a first time reference and a second time reference according to specific different time periods. Here, the first time reference primarily corresponds to an first state of the terminal, and usually refers to 7:00 to 22:00 on a current day. By taking a tsurikawa terminal as an example, during this time period, a vehicle where the tsurikawa terminal is located is in an operating state, and has an unfixed position, and the tsurikawa terminal is primarily in a dormant state, and has a relatively long wake-up period. The second time reference corresponds to an second state, and usually refers to 22:00 on a current day to 7:00 on a next day. During this time period, the tsurikawa terminal has a fixed position, and is suitable for communication with the gateway. Therefore, at this time, the tsurikawa terminal is primarily in an operating state or an updating state, and has a relatively short wake-up period. It should be illustrated, however, that the present disclosure is not limited thereto. In other words, in other embodiments, the first state and/or the second state is not limited to the above specific time periods. In some embodiments, the first time reference may last for 2 hours and the second time reference may last for 0.5 hours.

When the terminal is in the monitoring state of the terminal, the radio frequency circuit 10 may receive the gateway response information. Before the current wake-up period of the terminal is adjusted by the processor 20, it is firstly detected whether the terminal receives the gateway response information in the monitoring state. By taking a tsurikawa terminal as an example, when the tsurikawa terminal is in an first state, the tsurikawa terminal is in a normal state when it fails to receive the gateway response information, and is in an abnormal state when it receives the gateway response information. When the terminal is in an second state, the tsurikawa terminal is in a normal state when it receives the gateway response information, and is in an abnormal state when it fails to receive the gateway response information. When the tsurikawa terminal is in the abnormal state, a wake-up period of the terminal should be appropriately decreased to increase a number of wake-ups of the terminal, so as to enable the tsurikawa terminal to recover to the normal state as soon as possible.

Specifically, in some embodiments, when the gateway response information is received, if the terminal is in the first state, an adjustment parameter t is determined by the processor 20 to be an opposite number of a random number between 0 and one half of the first time reference, that is, t=−rand(0~first time reference/2), wherein rand( ) is a random function for generating a random value, and in the present embodiment, a value output by the rand function may comprise opposite endpoints, that is, a value of t may be 0 or "−(first time reference/2)"; and if the terminal is in the second state, the adjustment parameter t is determined by the processor 20 to be 0.

In some embodiments, when the gateway response information is not received, if the terminal is in the first state, the adjustment parameter t is determined by the processor 20 to be 0, and if the terminal is in the second state, the adjustment parameter t is determined by the processor 20 to be an opposite number of a random number between 0 and one half of the second time reference, that is, t=−rand(0~second time reference/2).

Then, the second wake-up period may be determined according to the current first wake-up period of the terminal and the adjustment parameter which is determined according to a reception condition of the gateway response information. In some embodiments, the second wake-up period may be a sum of the first wake-up period and the adjustment parameter t. Since t has a value of 0 in the normal state of the terminal and has a value of negative number in the abnormal state of the terminal, the second wake-up period may be the same as the first wake-up period when the terminal is in the normal state, and may be shorter than the first wake-up period when the terminal is in the abnormal state, so that the terminal may restore to the normal state as soon as possible by increasing a number of wake-ups.

In some embodiments, a value of the second wake-up period may further be adjusted according to a number of the heartbeat information broadcasted by the other terminals which is received by the terminal in the monitoring state. Firstly, it is detected by the processor 20 whether the terminal in the monitoring state receives the heartbeat information broadcasted by the other terminals. If the terminal does not receive the heartbeat information, the impact of the heartbeat information from the other terminals on the terminal may not be considered. In a case where the terminal receives the heartbeat information broadcasted by the other terminals, a number M of the heartbeat information from all the other terminals which is received by the terminal in the monitoring state is counted by the processor 20, and it is detected whether a value of M is greater than an actual measured balance value N of the terminal, wherein N is primarily determined based on factors such as a radio frequency rate of the terminal, a size of a heartbeat packet, and distances between the terminal and the other terminals, and may be obtained through actual measurement when needed. It should be illustrated that when the wake-up period is adjusted according to the number of the received heartbeat information, a statistics process and an adjustment process should be performed for the second state and the first state respectively to have effects on different time references respectively. In the present embodiment, the current time reference Tc is used to refer to the first time reference corresponding to the first state or the second time reference corresponding to the second state, and different time references may be used when the adjustment process is performed for the terminal in different states.

Specifically, the second wake-up period is primarily adjusted by the processor 20 according to the number of the heartbeat information in two ways of increasing the wake-up period and decreasing the wake-up period. In a case where the value of M is greater than N, the second wake-up period is adjusted in a way of increasing the wake-up period. At this time, the second wake-up period may be rand(0~(Tc+t))+r, wherein r is a random delay number. When M is less than or equal to N, the second wake-up period is adjusted in a way of decreasing the wake-up period. At this time, firstly, it is detected whether the current time reference Tc is greater than an initial wake-up period T0 (that is, an initial default wake-up period of the terminal). When Tc>T0, an intermediate value T' is determined to be (M+1)Tc/N. Then, a value of T' is compared with a value of T0. When T'≤T0, the second wake-up period is determined to be T0, i.e., the initial default wake-up period of the terminal. When T'>T0, the second wake-up period is determined to be T'+t+r, wherein t is the adjustment parameter which is determined according to the response condition from the gateway, and r is the random delay number; and when Tc≤T0, the second wake-up period is directly determined to be Tc+t+r, wherein t is the adjustment parameter which is determined according to the response condition from the gateway, and r is the random delay number.

Further, if it needs to adjust a next wake-up period of the terminal for several consecutive wake-ups of the terminal, the processor 20 may decrease a number of adjustment processes by directly adjusting the current time reference. Specifically, in actual use, each time the second wake-up period is adjusted, a counter is triggered to count a number of adjustment processes. After it is detected whether the number M of the heartbeat information of the other terminals is greater than the balance value N, it may be determined accordingly whether it needs to adjust the current time reference according to the counted number of the adjustment processes.

In a case where M>N, a current number of adjustment processes which are performed by the terminal on the second wake-up period is a first adjustment number. At this time, it is detected by the processor 20 whether the first adjustment number exceeds a first preset threshold. In a case where the first adjustment number does not exceed the first preset threshold, the second wake-up period is directly adjusted to rand((0~(Tc+t))+r in the manner described above, and a value of the first adjustment number is increased by 1 as a basis for next judgment. In a case where the first adjustment number exceeds the first preset threshold, the current time reference Tc is adjusted by the processor 20 to Tnew, and the second wake-up period is determined to be Tnew+r, wherein Tnew=(M+1)Tc/N. At this time, the first adjustment number is reset to 0, and is counted again during a next adjustment process.

In a case where M≤N and Tc>T0, the current number of adjustment processes which are performed by the terminal on the second wake-up period is a second adjustment number. At this time, it is detected by the processor 20 whether the second adjustment number exceeds a second preset threshold. In a case where the second adjustment number does not exceed the second preset threshold, an intermediate value T' is determined to be (M+1)Tc/N in the manner described above. When T'≤T0, the second wake-up period is determined by the processor 20 to be T0, and when T'>T0, the second wake-up period is determined by the processor 20 to be T'+t+r, and a value of the second adjustment number is increased by 1 as a basis for next adjustment. In a case where the second adjustment number exceeds the second preset threshold, the value of Tc is adjusted by the processor 20 to Tnew, the second wake-up period is determined to be Tnew+t+r, and the second adjustment number is reset to 0, wherein Tnew=(M+1)Tc/N. In addition, when M≤N and Tc≤T0, the second wake-up period may be directly determined to be Tc+t+r, and the first adjustment number and the second adjustment number may be reset to 0 at the same time. That is, the time reference needs not to be additionally adjusted at present, and the current wake-up period is adjusted according to the response condition from the gateway and the random delay number.

In the present embodiment, both the power consumption and efficiency of the terminal are taken into consideration, and the wake-up period is adjusted according to the time reference, the response condition from the gateway, and the monitored heartbeat conditions of other tsurikawa terminals. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus resulting in failure to acquire the operating states of the terminals and update the tasks.

According to yet another embodiment of the present disclosure, there is provided a storage medium which is a non-transitory computer-readable storage medium having stored thereon a computer program. The computer program, when executed by a processor, implements the method according to the above embodiment of the present disclosure. The computer program comprises the following steps S11 and S12.

In S11, heartbeat information is broadcast and a monitoring state is maintained for a first predetermined time.

In S12, a current first wake-up period of the terminal is adjusted to a second wake-up period when the monitoring state ends according to information received by the terminal in the monitoring state.

Specifically, the information received by the terminal in the monitoring state comprises at least one of gateway response information transmitted by a gateway according to the heartbeat information of the terminal, and heartbeat information broadcast by other terminals.

Before the computer program, when executed by the processor, implements the step of adjusting a current first wake-up period of the terminal to a second wake-up period when the monitoring state ends according to information received by the terminal in the monitoring state, the computer program further implements the following steps when executed by the processor: detecting whether the terminal receives the gateway response information in the monitoring state; when the terminal receives the gateway response information, determining an adjustment parameter t to be −rand(0~first time reference/2) if the terminal is an first state, and determining the adjustment parameter t to be 0 if the terminal is in an second state, wherein rand( ) is a random function for generating a random number; when the terminal does not receive the gateway response information, determining the adjustment parameter t to be 0 if the terminal is in the first state, and determining the adjustment parameter t to be −rand(0~second time reference/2) if the terminal is in the second state; and determining the second wake-up period according to the first wake-up period and the adjustment parameter.

When the computer program, when executed by the processor, implements the step of adjusting a current first wake-up period of the terminal to a second wake-up period when the monitoring state ends according to information received by the terminal in the monitoring state, the computer program specifically implements the following step when executed by the processor: adjusting the first wake-up period to a sum of the first wake-up period and the adjustment parameter, wherein the sum of the first wake-up period and the adjustment parameter is the second wake-up period.

When the computer program, when executed by the processor, implements the step of determining the second wake-up period according to the first wake-up period and the adjustment parameter, the computer program specifically implements the following steps when executed by the processor: detecting whether the terminal in the monitoring state receives the heartbeat information broadcasted by the other terminals; counting a number M of the heartbeat information received by the terminal in the monitoring state from the other terminals in a case where the terminal receives the heartbeat information broadcasted by the other terminals; and determining the second wake-up period according to the first wake-up period, the adjustment parameter, and the number M of the heartbeat information.

When the computer program, when executed by the processor, implements the step of determining the second wake-up period according to the first wake-up period, the adjustment parameter, and the number M of the heartbeat information, the computer program specifically implements the following steps when executed by the processor: detecting whether the number M of the heartbeat information of the other terminals is greater than a balance value N; determining the second wake-up period to be rand(0~(current time reference Tc+t))+r in a case where M>N, wherein r is a random delay number; detecting whether the current time reference Tc is greater than an initial wake-up period T0 in a case where M≤N; determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference.

After the computer program, when executed by the processor, implements the step of detecting whether the number M of the heartbeat information of the other terminals is greater than a balance value N, the computer program implements the following steps when executed by the processor: detecting whether a first adjustment number of the second wake-up period exceeds a first preset threshold in a case where M>N; determining the second wake-up period to be rand((0~(Tc+t))+r in a case where the first adjustment number does not exceed the first preset threshold, and increasing the value of the first adjustment number by 1, wherein r is the random delay number; and adjusting a value of Tc to Tnew in a case where the first adjustment number exceeds the first preset threshold, determining the second wake-up period to be Tnew+r and resetting the first adjustment number to 0, wherein Tnew=(M+1)Tc/N.

After the computer program, when executed by the processor, implements the step of detecting whether the number M of the heartbeat information of the other terminals is greater than a balance value N, the computer program implements the following steps when executed by the processor: detecting whether a second adjustment number of the second wake-up period exceeds a second preset threshold in a case where M≤N and Tc>T0; determining an intermediate value T' to be (M+1)Tc/N in a case where the second adjustment number does not exceed the second preset threshold, determining the second wake-up period to be T0 when T'≤T0, and determining the second wake-up period to be T'+t+r when T'>T0, and increasing the value of the second adjustment number by 1; and adjusting a value of Tc to Tnew in a case where the second adjustment number exceeds the second preset threshold, determining the second wake-up period to be Tnew+t+r, and resetting the second adjustment number to 0, wherein Tnew=(M+1)Tc/N.

In the present embodiment, the next wake-up periods of the terminals are adjusted according to a condition of the information received by the terminals in the monitoring state, so that each of the terminals may adjust its own wake-up period according to its own actual operation and monitoring condition. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus resulting in failure to acquire the operating states of the terminals and update the tasks.

Figure 5:
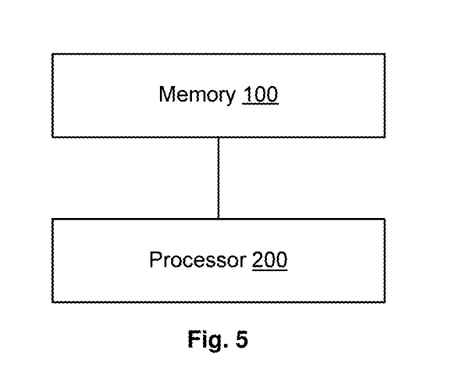
FIG. 5 is a schematic structural diagram of an electronic device according to an embodiment of the present disclosure.

According to a further embodiment of the present disclosure, there is provided an electronic device which may be any low-power terminal such as a tsurikawa terminal. A schematic structural diagram of the electronic device may be shown in FIG. 5, and at least comprises a memory 100 and a processor 200. The memory 100 has a computer program stored thereon, and the processor 200 implements the method according to any of the embodiments of the present disclosure when the processor 200 executes the computer program on the memory 100. As an example, the computer program of the electronic device comprises the following steps S21 and S22.

In S21, heartbeat information is broadcast and a monitoring state is maintained for a first predetermined time.

In S22, a current first wake-up period of the terminal is adjusted to a second wake-up period when the monitoring state ends according to information received by the terminal in the monitoring state.

Specifically, the information received by the terminal in the monitoring state comprises at least one of gateway response information transmitted by a gateway according to the heartbeat information of the terminal, and heartbeat information broadcast by other terminals.

Before the processor executes the computer program, stored on the memory, of adjusting a current first wake-up period of the terminal to a second wake-up period when the monitoring state ends according to information received by the terminal in the monitoring state, the processor further executes the following computer programs of detecting whether the terminal receives the gateway response information in the monitoring state; when the terminal receives the gateway response information, determining an adjustment parameter t to be −rand(0~first time reference/2) if the terminal is an first state, and determining the adjustment parameter t to be 0 if the terminal is in an second state, wherein rand( ) is a random function for generating a random number; when the terminal does not receive the gateway response information, determining the adjustment parameter t to be 0 if the terminal is in the first state, and determining the adjustment parameter t to be −rand(0~second time reference/2) if the terminal is in the second state; and determining the second wake-up period according to the first wake-up period and the adjustment parameter.

When the processor executes the computer program, stored on the memory, of adjusting a current first wake-up period of the terminal to a second wake-up period when the monitoring state ends according to information received by the terminal in the monitoring state, the processor specifically executes the following computer program of adjusting the first wake-up period to a sum of the first wake-up period and the adjustment parameter, wherein the sum of the first wake-up period and the adjustment parameter is the second wake-up period.

When the processor executes the computer program, stored on the memory, of determining the second wake-up period according to the first wake-up period and the adjustment parameter, the processor specifically executes the following computer programs of detecting whether the terminal in the monitoring state receives the heartbeat information broadcasted by the other terminals; counting a number M of the heartbeat information received by the terminal in the monitoring state from the other terminals in a case where the terminal receives the heartbeat information broadcasted by the other terminals; and determining the second wake-up period according to the first wake-up period, the adjustment parameter, and the number M of the heartbeat information.

When the processor executes the computer program, stored on the memory, of determining the second wake-up period according to the first wake-up period, the adjustment parameter, and the number M of the heartbeat information, the processor specifically executes the following computer programs of detecting whether the number M of the heartbeat information of the other terminals is greater than a balance value N; determining the second wake-up period to be rand(0~(current time reference Tc+t))+r in a case where M>N, wherein r is a random delay number; detecting whether the current time reference Tc is greater than an initial wake-up period T0 in a case where M≤N; determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference.

After the processor executes the computer program, stored on the memory, of detecting whether the number M of the heartbeat information of the other terminals is greater than a balance value N, the processor further executes the following computer programs of detecting whether a first adjustment number of the second wake-up period exceeds a first preset threshold in a case where M>N; determining the second wake-up period to be rand(0~(Tc+t))+r in a case where the first adjustment number does not exceed the first preset threshold, and increasing the value of the first adjustment number by 1, wherein r is the random delay number; and adjusting a value of Tc to Tnew in a case where the first adjustment number exceeds the first preset threshold, determining the second wake-up period to be Tnew+r and resetting the first adjustment number to 0, wherein Tnew=(M+1)Tc/N.

After the processor executes the computer program, stored on the memory, of detecting whether the number M of the heartbeat information of the other terminals is greater than a balance value N, the processor further executes the following computer programs of detecting whether a second adjustment number of the second wake-up period exceeds a second preset threshold in a case where M≤N and Tc>T0; determining an intermediate value T' to be (M+1)Tc/N in a case where the second adjustment number does not exceed the second preset threshold, determining the second wake-up period to be T0 when T'≤T0, and determining the second wake-up period to be T'+t+r when T'>T0, and increasing the value of the second adjustment number by 1; and adjusting a value of Tc to Tnew in a case where the second adjustment number exceeds the second preset threshold, determining the second wake-up period to be Tnew+r, and resetting the second adjustment number to 0, wherein Tnew=(M+1)Tc/N.

In the present embodiment, the next wake-up periods of the terminals are adjusted according to a condition of the information received by the terminals in the monitoring state, so that each of the terminals may adjust its own wake-up period according to its own actual operation and monitoring condition. This avoids the problem that the wake-up times of the multiple devices are the same due to centralized power-on of the multiple devices, which in turn results in centralized heartbeat information and air data congestion. Further, it ensures that the multiple terminals may wake up at different times to avoid the problem of failure to receive the heartbeat information or issue tasks by the gateway due to the data congestion, thus resulting in failure to acquire the operating states of the terminals and update the tasks.

Figure 6A:
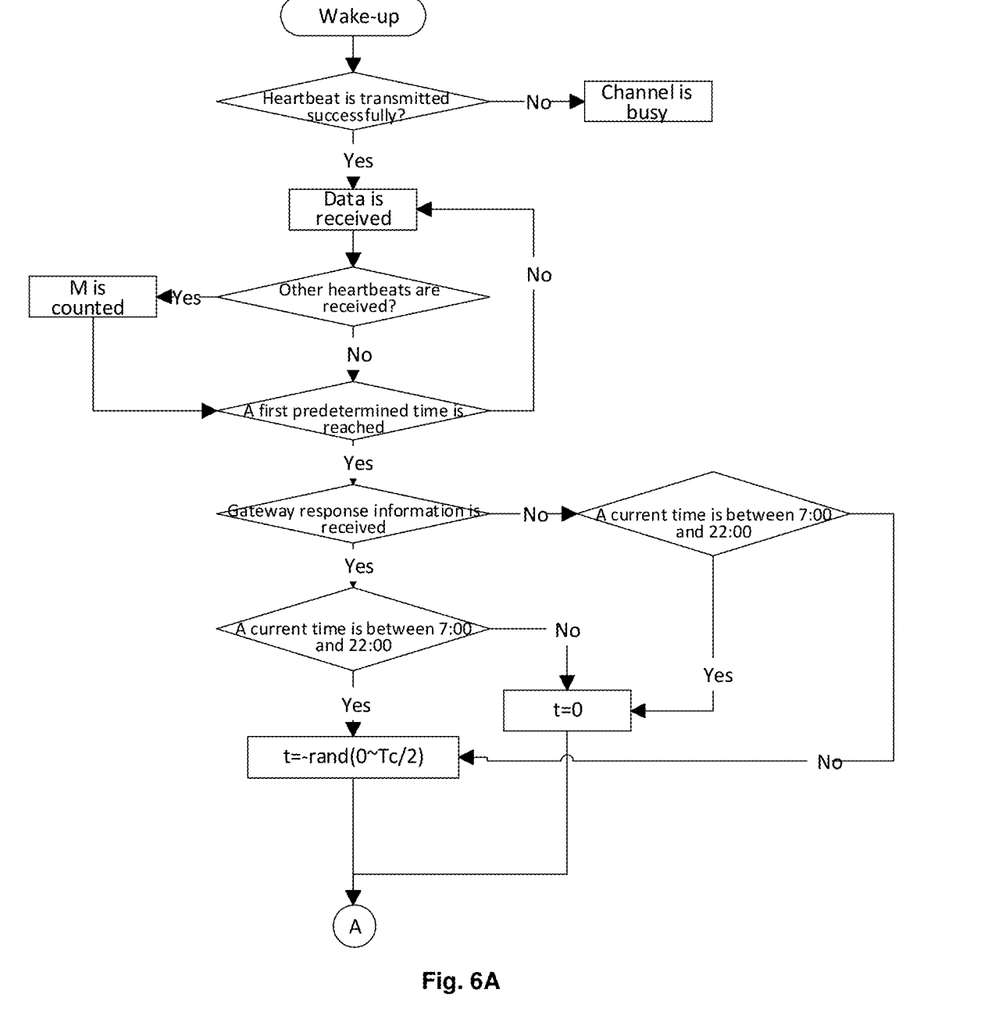
FIG. 6A and FIG. 6B are a schematic flowchart of adjustment of a wake-up period by an electronic device in one wake-up period according to an embodiment of the present disclosure.
Figure 6B:
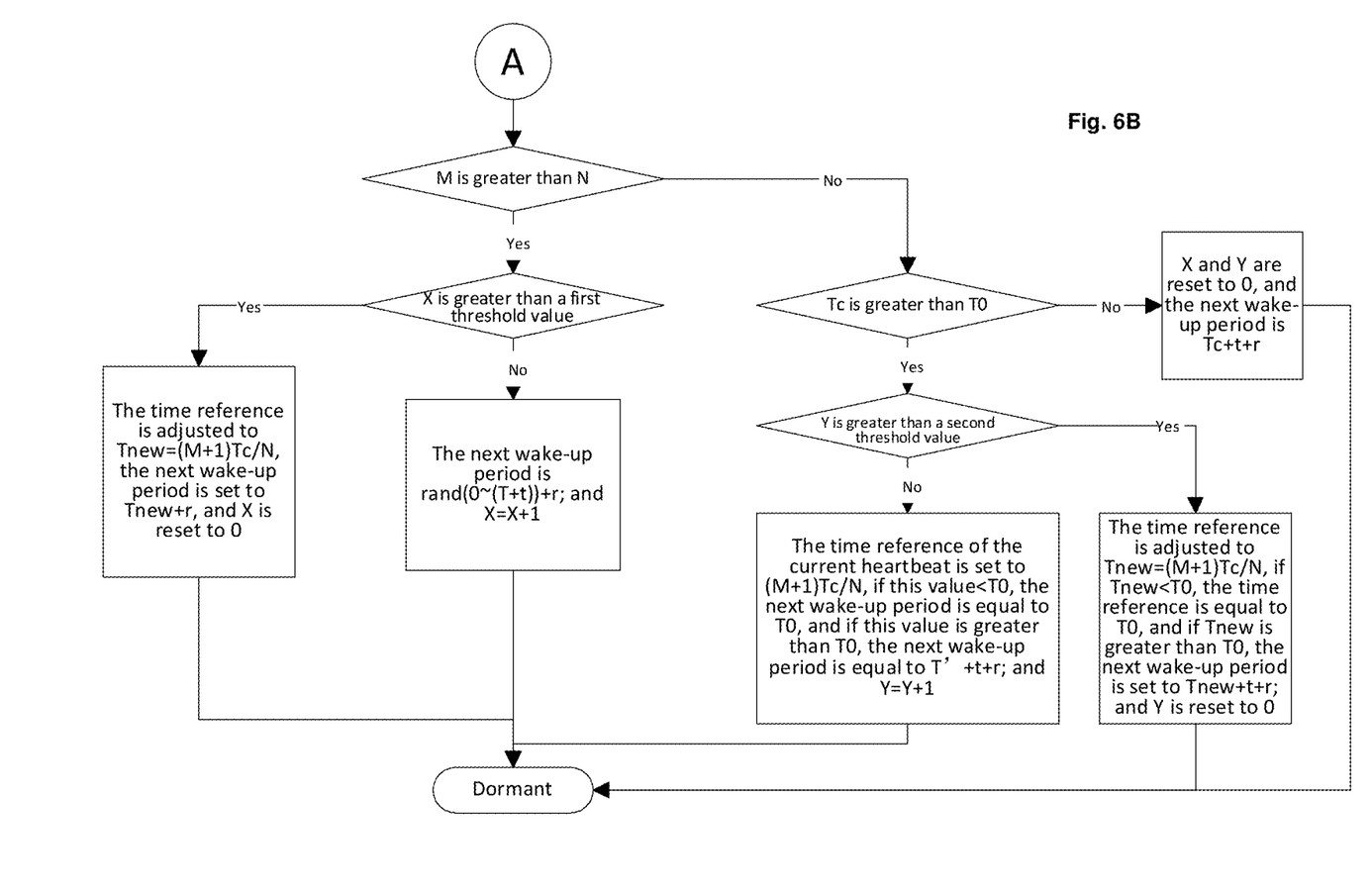

FIG. 6A and FIG. 6B illustrate a flow of adjustment of a wake-up period by an electronic device in one wake-up period. After the electronic device wakes up, it is firstly detected whether heartbeat information is broadcast successfully. If a channel has been in a busy state all the time and may not broadcast the heartbeat information, an interval between the current heartbeat and a next heartbeat may be set to be proportional to a number of attempts until a time reference is reached. After the heartbeat information is broadcast successfully, the terminal enters a monitoring state and waits for receiving a response from a gateway and/or heartbeat information of other terminals. The terminal continuously receives other information before a first predetermined time ends, and counts a number M of other heartbeats received. When the first predetermined time is reached, it is detected whether the gateway response information is received, and it is determined whether a value of an adjustment parameter t is 0 or −rand(0~Tc/2) according to a current time period. Here, Tc is the current time reference, and may be obtained by substituting a value of Tc with a value of T1 or T2 according to the current time period. Then, a value of M is compared with a balance value N. When M is greater than N, it is determined whether a first adjustment number X is greater than a first preset threshold. In a case where the first adjustment number X is greater than or equal to the first preset threshold, the current time reference is adjusted to Tnew=(M+1)Tc/N, a next wake-up period is set to Tnew+r, and then the terminal enters a dormant mode after the wake-up ends; and when X is less than the first preset threshold, the next wake-up period is directly adjusted to rand(0~(Tc+t))+r, a value of X is increased by 1, and then the terminal enters the dormant mode after the wake-up ends. When M≤N, it is determined whether Tc is greater than an initial time reference T0. When Tc>T0, it is determined whether a second adjustment number Y is greater than a second preset threshold. In a case where the second adjustment number Y is greater than or equal to the second preset threshold, the current time reference is adjusted to Tnew=(M+1)Tc/N. If Tnew is less than or equal to T0, the current time reference is adjusted to T0, and if Tnew is greater than T0, the next wake-up period is set to Tnew+t+r, Y is reset to 0, and then the terminal enters the dormant mode after the wake-up ends. When Y is less than the second preset threshold, an intermediate value T' is determined to be (M+1)Tc/N. When T'≤T0, the next wake-up period is determined to be T0; and when T'>T0, the next wake-up period is determined to be T'+t+r, the value of Y is increased by 1, and then the terminal enters the dormant mode after the wake-up ends. When Tc is less than or equal to T0, X and Y are reset to 0, the next wake-up period is set to Tc+t+r, and then the terminal enters the dormant mode after the wake-up ends.

The multiple embodiments of the present disclosure have been described in detail above, but the present disclosure is not limited to these specific embodiments. Those skilled in the art may make various variations and modifications to the embodiments on the basis of the concept of the present disclosure. These variations and modifications should all fall within the protection scope of the present disclosure.

We claim:

1. A method for adjusting a wake-up period of a terminal, the method comprising:
   broadcasting, by the terminal, heartbeat information and remaining in a monitoring state for a first predetermined time; and
   adjusting, by the terminal, a current first wake-up period of the terminal to a second wake-up period when the monitoring state ends according to information received by the terminal in the monitoring state,
   wherein the information received by the terminal in the monitoring state comprises at least one of:
      gateway response information transmitted by a gateway in response to the heartbeat information broadcast by the terminal, and
      heartbeat information broadcast by other terminals, and
   wherein before the step of adjusting a current first wake-up period of the terminal to a second wake-up period when the monitoring state ends according to information received by the terminal in the monitoring state, the method further comprises:
      detecting whether the terminal receives the gateway response information in the monitoring state;
      when the terminal receives the gateway response information, determining an adjustment parameter t to be −rand(0~T1/2) if the terminal is an first state, and determining the adjustment parameter t to be 0 if the terminal is in an second state, wherein rand( ) is a random function for generating a random number, T1 being a first time reference;
      when the terminal does not receive the gateway response information, determining the adjustment parameter t to be 0 if the terminal is in the first state, and determining the adjustment parameter t to be −rand(0~T2/2) if the terminal is in the second state, T2 being a second time reference; and
      determining the second wake-up period according to the first wake-up period and the adjustment parameter.

2. The method according to claim 1, wherein the step of adjusting a current first wake-up period of the terminal to a second wake-up period when the monitoring state ends according to information received by the terminal in the monitoring state comprises:
   adjusting the first wake-up period to a sum of the first wake-up period and the adjustment parameter, wherein the sum of the first wake-up period and the adjustment parameter is the second wake-up period.

3. The method according to claim 1, wherein the step of determining the second wake-up period according to the first wake-up period and the adjustment parameter comprises:
   detecting whether the terminal in the monitoring state receives the heartbeat information broadcasted by the other terminals;
   counting a number M of the heartbeat information received by the terminal in the monitoring state from the other terminals in a case where the terminal receives the heartbeat information broadcasted by the other terminals; and
   determining the second wake-up period according to the first wake-up period, the adjustment parameter, and the number M of the heartbeat information.

4. The method according to claim 3, wherein the step of determining the second wake-up period according to the first wake-up period, the adjustment parameter, and the number M of the heartbeat information comprises:
   detecting whether the number M of the heartbeat information of the other terminals is greater than a balance value N;
   determining the second wake-up period to be rand(0~(Tc+t))+r in a case where M>N, wherein r is a random delay number, and Tc is a current time reference;
   detecting whether the current time reference Tc is greater than an initial wake-up period T0 in a case where M≤N;
   determining an intermediate value T'=(M+1)Tc/N when Tc>T0, detecting whether T' is greater than T0, determining the second wake-up period to be T0 when T'≤T0, and determining the second wake-up period to be T'+t+r when T'>T0; and
   determining the second wake-up period to be Tc+t+r when Tc≤T0,
   wherein Tc is the first time reference or the second time reference.

5. The method according to claim 4, wherein after the step of detecting whether the number M of the heartbeat information of the other terminals is greater than a balance value N, the method further comprises:
   detecting whether a first adjustment number of the second wake-up period exceeds a first preset threshold in a case where M>N;
   determining the second wake-up period to be rand(0~(Tc+t))+r in a case where the first adjustment number does not exceed the first preset threshold, and increasing the value of the first adjustment number by 1; and
   adjusting a value of Tc to Tnew in a case where the first adjustment number exceeds the first preset threshold, determining the second wake-up period to be Tnew+r and resetting the first adjustment number to 0, wherein Tnew=(M+1)Tc/N.

6. The method according to claim 4, wherein after the step of detecting whether the number M of the heartbeat information of the other terminals is greater than a balance value N, the method further comprises:
   detecting whether a second adjustment number of the second wake-up period exceeds a second preset threshold in a case where M≤N and Tc>T0;
   determining an intermediate value T' to be (M+1)Tc/N in a case where the second adjustment number does not exceed the second preset threshold, determining the second wake-up period to be T0 when T'≤T0, and determining the second wake-up period to be T'+t+r when T'>T0, and increasing the value of the second adjustment number by 1; and
   adjusting a value of Tc to Tnew in a case where the second adjustment number exceeds the second preset threshold, determining the second wake-up period to be Tnew+t+r, and resetting the second adjustment number to 0, wherein Tnew=(M+1)Tc/N.

7. The method according to claim 3, wherein the step of determining the second wake-up period according to the first wake-up period, the adjustment parameter, and the number M of the heartbeat information comprises:
   detecting the relationship between the number M of the heartbeat information of the other terminals, a balance value N, and an error tolerance L for the balance value N;
   determining the second wake-up period to be rand(0~(Tc+t))+r in a case where M>N+L, wherein r is a random delay number and Tc is a current time reference;

detecting whether the current time reference Tc is greater than an initial wake-up period T0 in a case where M≤N−L;

determining an intermediate value T'=(M+1)Tc/N when Tc>T0, determining the second wake-up period to be T0 when T'≤T0, and determining the second wake-up period to be T'+t+r when T'>T0; and determining the second wake-up period to be Tc+t+r when Tc≤T0, wherein Tc is the first time reference or the second time reference, resetting the first adjustment number and the second adjustment number to 0 and determining the second wake-up period to be Tc+t+r in a case where N−L<M≤N+L.

8. An apparatus for adjusting a wake-up period of a terminal, the apparatus comprising:

a radio frequency circuit configured to broadcast heartbeat information and remain in a monitoring state for a first predetermined time; and a processor communicatively coupled to the radio frequency circuit and configured to adjust a current first wake-up period of the terminal to a second wake-up period when the monitoring state ends according to information received by the radio frequency circuit in the monitoring state, wherein the information received by the radio frequency circuit in the monitoring state comprises at least one of:

gateway response information transmitted by a gateway in response to the heartbeat information of the terminal, and heartbeat information broadcast by other terminals, and wherein the processor is further configured to:

detect whether the terminal receives the gateway response information in the monitoring state;

when the terminal receives the gateway response information, determine an adjustment parameter t to be −rand(0~T1/2) if the terminal is an first state, and determine the adjustment parameter t to be 0 if the terminal is in an second state, wherein rand( ) is a random function for generating a random number, T1 being a first time reference;

when the terminal does not receive the gateway response information, determine the adjustment parameter t to be 0 if the terminal is in the first state, and determine the adjustment parameter t to be −rand(0~T2/2) if the terminal is in the second state, T2 being a second time reference; and determine the second wake-up period according to the first wake-up period and the adjustment parameter.

9. The apparatus according to claim 8, wherein the processor is further configured to:

adjust the first wake-up period to a sum of the first wake-up period and the adjustment parameter, wherein the sum of the first wake-up period and the adjustment parameter is the second wake-up period.

10. The apparatus according to claim 8, wherein the processor is further configured to:

detect whether the terminal in the monitoring state receives the heartbeat information broadcasted by the other terminals;

count a number M of the heartbeat information received by the terminal in the monitoring state from the other terminals in a case where the terminal receives the heartbeat information broadcasted by the other terminals; and determine the second wake-up period according to the first wake-up period, the adjustment parameter, and the number M of the heartbeat information.

11. The apparatus according to claim 8, wherein the processor is further configured to:

detect whether the number M of the heartbeat information of the other terminals is greater than a balance value N;

determine the second wake-up period to be rand(0~(Tc+ t))+r in a case where M>N, wherein r is a random delay number, and Tc is a current time reference;

detect whether the current time reference Tc is greater than an initial wake-up period T0 in a case where M≤N;

determine an intermediate value T'=(M+1)Tc/N when Tc>T0, detect whether T' is greater than T0, determine the second wake-up period to be T0 when T'≤T0, and determine the second wake-up period to be T'+t+r when T'>T0; and determine the second wake-up period to be Tc+t+r when Tc≤T0, wherein Tc is the first time reference or the second time reference.

12. The apparatus according to claim 11, wherein the processor is further configured to:

detect whether a first adjustment number of the second wake-up period exceeds a first preset threshold in a case where M>N;

determine the second wake-up period to be rand(0~(Tc+ t))+r in a case where the first adjustment number does not exceed the first preset threshold, and increase the value of the first adjustment number by 1; and adjust a value of Tc to Tnew in a case where the first adjustment number exceeds the first preset threshold, determine the second wake-up period to be Tnew+r and reset the first adjustment number to 0, wherein Tnew= (M+1)Tc/N.

13. The apparatus according to claim 11, wherein the processor is further configured to:

detect whether a second adjustment number of the second wake-up period exceeds a second preset threshold in a case where M≤N and Tc>T0;

determine an intermediate value T' to be (M+1)Tc/N in a case where the second adjustment number does not exceed the second preset threshold, determine the second wake-up period to be T0 when T'≤T0, and determine the second wake-up period to be T'+t+r when T'>T0, and increase the value of the second adjustment number by 1; and adjust a value of Tc to Tnew in a case where the second adjustment number exceeds the second preset threshold, determine the second wake-up period to be Tnew+ t+r, and reset the second adjustment number to 0, wherein Tnew=(M+1)Tc/N.

14. The apparatus according to claim 11, wherein the processor is further configured to:

detect the relationship between the number M of the heartbeat information of the other terminals, a balance value N, and an error tolerance L for the balance value N;

determine the second wake-up period to be rand(0~(Tc+ t))+r in a case where M>N+L, wherein r is a random delay number and Tc is a current time reference;

detect whether the current time reference Tc is greater than an initial wake-up period T0 in a case where M≤N−L;

determine an intermediate value T'=(M+1)Tc/N when Tc>T0, determine the second wake-up period to be T0 when T'≤T0, and determine the second wake-up period to be T'+t+r when T'>T0; and determine the second wake-up period to be Tc+t+r when Tc≤T0, wherein Tc is the first time reference or the second time reference, reset the first adjustment number and the second adjustment number to 0 and determine the second wake-up period to be Tc+t+r in a case where N−L<M≤N+L.

15. A non-transitory computer-readable storage medium having stored thereon a computer program which, when executed by a processor, implements the steps of the method according to claim 1.

* * * * *